United States Patent [19]

Brewer

[11] Patent Number: 4,880,198
[45] Date of Patent: Nov. 14, 1989

[54] CRANKING BOARD FOR GASOLINE POWERED HAND TOOL

[76] Inventor: Henry E. Brewer, 3900 Fowler Rd., Springfield, Ohio 45502

[21] Appl. No.: 36,945

[22] Filed: Apr. 10, 1987

[51] Int. Cl.$^4$ ............................................. F16M 11/00
[52] U.S. Cl. ................................... 248/346; 211/70.7;
7/170; 248/687; 248/500; 248/121; 248/154
[58] Field of Search ............ 248/346, 359.1, DIG. 12, 248/678, 500, 316.4, 309.1, 146, 154, 152, 646, 640, 499, 117.6, 122, 121; 211/70.6, 89, 45, 13; 7/170, 114; 222/478

[56] References Cited

U.S. PATENT DOCUMENTS

| | | | |
|---|---|---|---|
| 346,201 | 7/1886 | Hibarger | 211/70.6 |
| 1,408,253 | 2/1922 | Blank | 248/146 X |
| 2,876,942 | 3/1959 | Johnson | 248/346 X |
| 2,906,489 | 9/1959 | Reagan et al. | 248/346 |
| 3,050,218 | 8/1962 | Harvey | 222/478 X |
| 3,718,129 | 2/1973 | McKee | 123/179 X |
| 4,044,978 | 8/1977 | Williams | 248/640 |
| 4,168,007 | 9/1979 | Rohatensky | 248/154 X |
| 4,351,209 | 9/1982 | Alford | 248/150 X |
| 4,733,836 | 3/1988 | Barnes | 248/122 X |

Primary Examiner—Ramon S. Britts
Assistant Examiner—Karen J. Chotkowski
Attorney, Agent, or Firm—Biebel, French & Nauman

[57] ABSTRACT

A cranking board for supporting a gasoline powered hand tool during hand cranking. The engine of the hand tool is supported by a bracket arrangement mounted on an engine support portion of the cranking board. The cranking board also has an operator support portion rigidly connected to the ending support portion for supporting the knees of a person who is hand cranking the tool. There is also disclosure of a spill-resistant container mounted on the cranking board.

9 Claims, 2 Drawing Sheets

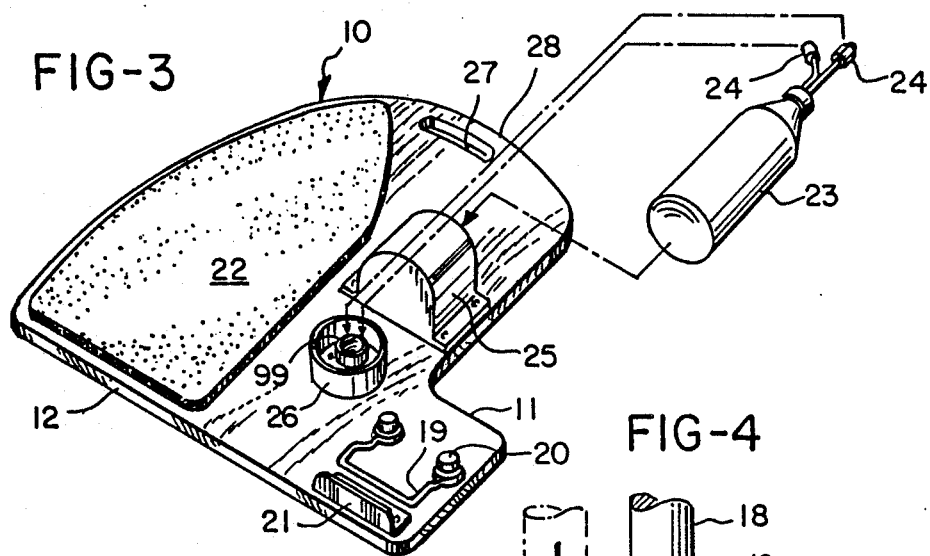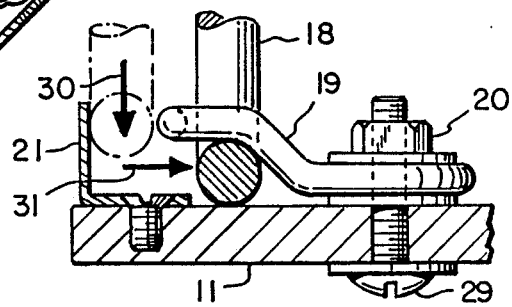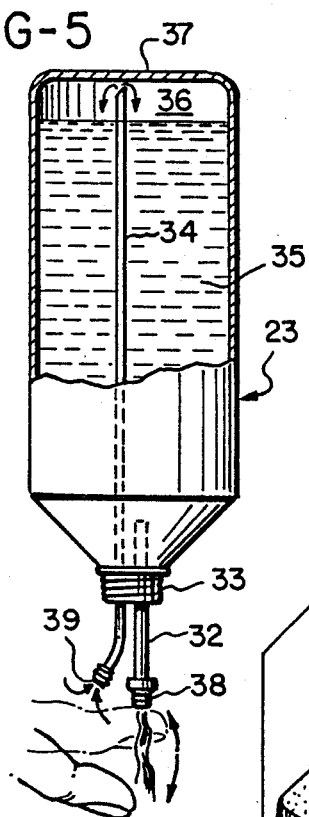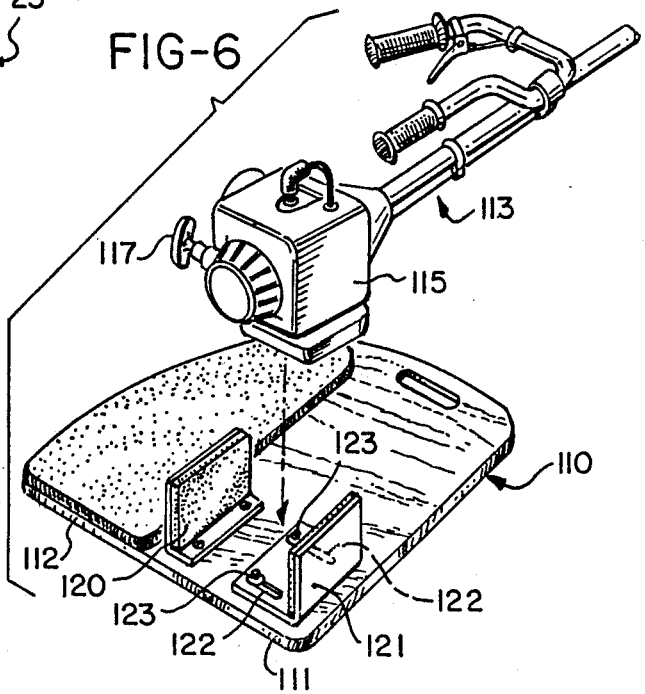

CRANKING BOARD FOR GASOLINE POWERED HAND TOOL

BACKGROUND OF THE INVENTION

This invention relates to the general field of hand tools such as string-type weed cutters which are powered by gasoline engines. Such tools often times are provided with starters of the pull-cord type. An operator who desires to start such a tool must grip the tool firmly with one hand while pulling the pull-cord with the other. The engine generates considerable resistance torque during the cranking action, and this tends to cause a resultant twisting of the tool. Such twisting may pose severe difficulties for operators who are slight of frame, especially women and elderly persons.

SUMMARY OF THE INVENTION

It is an object of the present invention to provide convenient means for restraining the twisting of a gasoline powered hand tool during manual cranking thereof. This object is accomplished by providing a cranking board having an engine support portion for supporting the tool during operation of the starter and an operator support portion rigidly connected to the engine support portion for supporting the knees of a person operating the starter. Bracket means are mounted on the engine support portion for engaging the tool and resisting rotation thereof during operation of the starter.

In preferred embodiment the cranking board is provided with a kneeling pad, retention means for retaining a gasoline container and a cup for receiving caps from the gasoline container and the cap from the fuel tank of the hand tool. A handle may be provided for manual transportation of the cranking board.

In further preferred embodiment the cranking board carries a gasoline container which is provided with means for preventing gasoline spillage during refueling of the tool. For that purpose the gasoline container has a gasoline exit tube and an air supply tube protruding from one end. The air supply tube extends internally through the container to a point near the end facing the surface of the gasoline during the refueling. The gasoline exit tube may be covered by the finger of the operator while being positioned above the opening of the tool's gasoline tank. This temporarily prevents leakage of gasoline from the container. After the gasoline exit tube has been so positioned, the operator removes his finger thereby permitting free flow of gasoline.

BRIEF DESCRIPTION OF THE DRAWINGS

FIG. 3 is an illustration of a cranking board.

FIG. 4 is an enlarged side elevation view illustrating the retention of a hand tool by a retaining bracket.

FIG. 5 is a partially cut away side elevation view of a gasoline container during refueling of a gasoline powered hand tool.

FIG. 6 illustrates an alternative embodiment of a cranking board.

DESCRIPTION OF THE PREFERRED EMBODIMENTS

Figure 1:
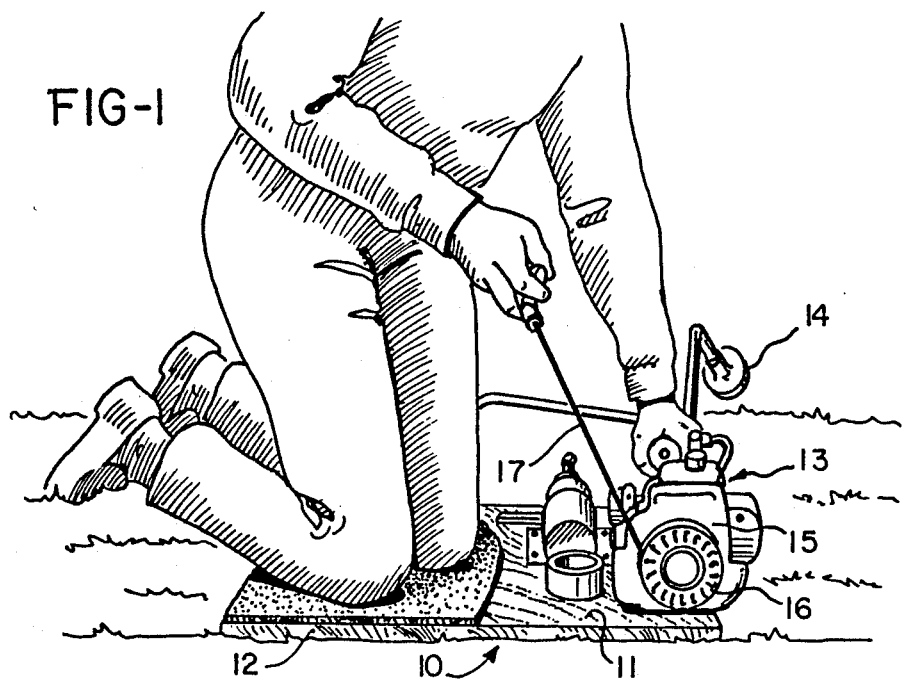
FIG. 1 illustrates the cranking of a hand tool in accordance with the present invention.
Figure 2:
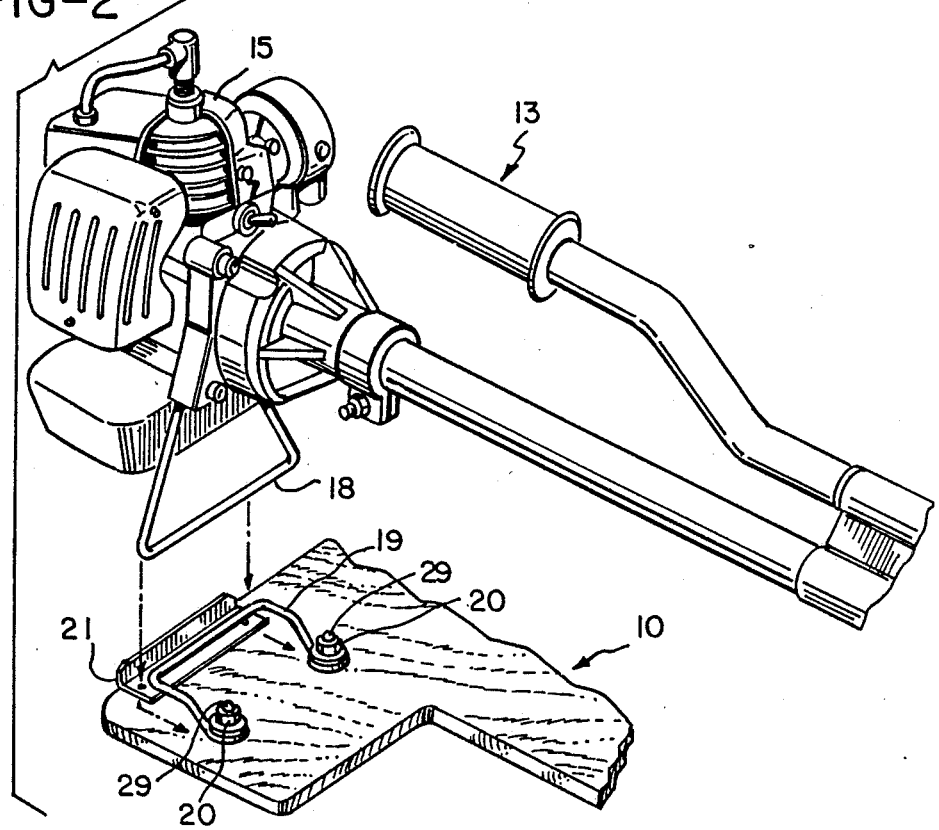
FIG. 2 illustrates the movement of a hand tool during fixation to a cranking board.

A cranking board 10 in accordance with the present invention comprises an engine support portion 11 and an operator support portion 12, as illustrated in FIG. 1. Operator support portion 12 is rigidly connected to engine support portion 11, single piece construction being preferred. During a cranking operation a hand tool 13, which may be a string-type weed cutter equipped with a nylon string 14, has its engine 15 positioned on engine support portion 11. Engine 15 is held securely in position by bracket means 19 (FIGS. 2 thru 4). Engine 15 is equipped with a starter 16 which is activated by a pull-cord 17. During the cranking operation the operator kneels on the operator support portion 12 and pulls pull-cord 17. The operator may grip tool 13 with his spare hand as desired.

As noted above, engine 15 is gripped by bracket means 19 during the cranking operation. In general bracket means 19 is configured as required to meet the specific needs of the tool being supported. Thus, as illustrated in FIG. 2, bracket means 19 may comprise an upstanding U-shaped rod secured to cranking board 10 by bolts 29, 29 and nuts 20, 20. Tool 13 may be equipped with an extension rod 18 which slips under bracket means 19. Insertion of extension rod 18 under bracket means 19 may be facilitated by a retainer 21. Retainer 21 may be fabricated from a simple piece of angle iron. As illustrated in more detail in FIG. 4, extension rod 18 is first thrust downwardly inside retainer 21, as illustrated by the vertical arrow 30. Extension rod 18 is then moved horizontally under bracket means 19, as illustrated by the arrow 31. After extension rod 18 has been positioned as illustrated in FIG. 4, the engine cranking operation may commence. During such cranking any twisting of tool 13 is resisted by bracket means 19 which in turn is supported by the weight of the kneeling operator.

The overall configuration of cranking board 10 may be as generally illustrated in FIG. 3. As noted thereon, a kneeling pad 22 may be provided for operator comfort. Kneeling pad 22 may be of cork, carpeting or other convenient construction. Cranking board 10 may also be provided with retention means 25 for a gasoline container 23 hereinafter described in more detail. Gasoline container 23 may be used for refueling hand tool 13 and is provided with a pair of caps 24, 24 which are removed during the refueling operation. A cup 26 is mounted on cranking board 10 for temporary retention of caps 24, 24. The fuel tank cap 99 from engine 15 may also be placed in cup 26. Cranking board 10 is intended to be manually transportable and for this purpose a slot 27 is provided for insertion of the hand of the operator. Slot 27 is positioned near an edge of cranking board 10 so as to define a handle 28.

Gasoline container 23 includes a gasoline exit tube 32 and an air supply tube 34, as best illustrated in FIG. 5. Gasoline exit tube 32 and air supply tube 34 both protrude through that end 33 of gasoline container 23 which is lowermost when the container is inverted for refueling of the hand tool. Air supply tube 34 extends inwardly through gasoline container 23 so as to reach a point near the upper end 37 of gasoline container 23. Thus, air supply tube 34 protrudes into an air space 36 above the surface of a supply of gasoline 35 carried by gasoline container 23.

When the operator desires to refuel hand tool 13 he removes gasoline container 23 from retention means 25 and unscrews the caps 24, 24. Caps 24, 24 are placed in cup 26, and the operator then places his finger over exit port 38 of gasoline supply tube 32. Gasoline container 23 is then inverted into the position illustrated in FIG. 5. So long as the operator keeps his finger over the exit port 38, no fuel may exit therefrom. Gasoline container 23 may then be positioned above the opening to the fuel tank of engine 15. Thereafter the operator uncovers exit port 38 to permit the free flow of gasoline into the fuel tank. Pressure relief is afforded during gasoline flow by air entering the port 39 at the end of air supply tube 34. When refueling has been completed, exit port 38 is again covered.

In an alternative embodiment this invention may take the form of a cranking board 110, as generally illustrated in FIG. 6. Cranking board 110 may be used with a tool 113 having an engine 115 of generally rectangular configuration. Engine 115 is positioned on cranking board 110 and supported by bracket means comprising a pair of upstanding walls 120, 121. Wall 120 may be fixed on engine support portion 111 of cranking board 110 whereas wall 121 may be adjustable for accommodating different engine sizes. Adjustability of the wall 121 may be provided by adjustment nuts 123, 123 extending above slots 122, 122 in adjustable wall 121. Cranking board 110 also has a kneeling pad 118 mounted on operator support portion 112 for kneeling comfort while an operator operates pull cord 117 of tool 113. Walls 120 and 121 prevent twisting of tool 113 while pull-cord 117 is operated. As with the previously described embodiment, operator support portion 112 and engine support portion 111 are rigidly interconnected.

While the forms of apparatus herein described constitute preferred embodiments of this invention, it is to be understood that the invention is not limited to these precise forms of apparatus, and that changes may be made therein whithout departing from the scope of the invention which is defined in the appended claims.

What is claimed is:

1. A cranking board for a hand tool powered by a gasoline engine having a starter of the pull-cord type comprising:

an engine support portion for supporting said tool during operation of said starter an engine support portion rigidly conected to said engine support portion and substantially co-planar therewith for supporting the knees of a person operating said starter, and bracket means mounted on said engine support portion for engaging said tool and resisting rotation thereof during operation of said starter, said cranking board being free of attachment to any supporting structure and being adapted for use at ground level.

2. A cranking board according to claim 1 further comprising a kneeling pad mounted on said operator support portion.

3. A cranking board according to claim 2 further comprising retention means mounted thereon for retaining a gasoline container.

4. A cranking board according to claim 3 further comprising a cup mounted thereon for receiving a cap from said gasoline container.

5. A cranking board according to claim 1 further comprising a gasoline container mounted thereon.

6. Apparatus according to claim 5 wherein said gasoline container comprises:

a gasoline exit tube protruding from one end thereof, and an air supply tube protruding from said one end; said air supply tube extending internally through said container to a point near an end of said container which is opposite said one end.

7. Apparatus according to claim 5 further comprising a kneeling pad mounted on said operator support portion.

8. Apparatus according to claim 7 further comprising handle means for manual transportation thereof.

9. Apparatus according to claim 8 further comprising a cup mounted theron for receiving caps from said gasoline container and a cap from a fuel tank for said engine.

* * * * *

UNITED STATES PATENT AND TRADEMARK OFFICE
CERTIFICATE OF CORRECTION

PATENT NO. : 4,880,198
DATED : November 14, 1989
INVENTOR(S) : Henry E. Brewer

It is certified that error appears in the above-identified patent and that said Letters Patent is hereby corrected as shown below:

Column 4, line 3 (Claim 1)

Change "engine" to read -- operator --.

Signed and Sealed this

Sixteenth Day of October, 1990

*Attest:*

HARRY F. MANBECK, JR.

*Attesting Officer*  *Commissioner of Patents and Trademarks*